(12) United States Patent
Salser, Jr. et al.

(10) Patent No.: US 8,164,480 B2
(45) Date of Patent: Apr. 24, 2012

(54) REMOTE MODULE FOR UTILITY METERS

(75) Inventors: Floyd Stanley Salser, Jr., Ocala, FL (US); Joseph Frank Preta, Tampa, FL (US); William Monty Simmons, Lenoir, NC (US)

(73) Assignee: F.C. Patents, Ocala, FL (US)

( * ) Notice: Subject to any disclaimer, the term of this patent is extended or adjusted under 35 U.S.C. 154(b) by 933 days.

(21) Appl. No.: 12/050,138

(22) Filed: Mar. 17, 2008

(65) Prior Publication Data

US 2009/0066537 A1 Mar. 12, 2009

Related U.S. Application Data

(60) Provisional application No. 60/894,980, filed on Mar. 15, 2007.

(51) Int. Cl.
*G08C 15/06* (2006.01)
*G01R 11/56* (2006.01)
*G06F 17/00* (2006.01)
*G01R 19/00* (2006.01)
*G01D 9/00* (2006.01)

(52) U.S. Cl. .............. 340/870.02; 340/870.03; 705/412; 705/400; 324/103 R; 346/14 MR

(58) Field of Classification Search ............. 340/870.02, 340/870.03; 705/412, 400; 324/103 R; 346/14 MR; 750/412, 400; 246/14 MR
See application file for complete search history.

(56) References Cited

U.S. PATENT DOCUMENTS

| 4,254,472 | A | * | 3/1981 | Juengel et al. | 702/188 |
| 5,111,407 | A | * | 5/1992 | Galpern | 702/62 |
| 5,602,744 | A | * | 2/1997 | Meek et al. | 705/412 |
| 7,908,606 | B2 | * | 3/2011 | Depro et al. | 718/104 |
| 2010/0176967 | A1 | * | 7/2010 | Cumeralto et al. | 340/870.02 |

* cited by examiner

*Primary Examiner* — Jared Fureman
*Assistant Examiner* — Scott Bauer
(74) *Attorney, Agent, or Firm* — Monty Simmons; Simmons Patents

(57) ABSTRACT

The present invention relates to a remote display module (RDM) for display a resource consumption value synchronized with a resource consumption value indicated by a meter metering resource consumption. The RDM is configured with one or more inputs that are electrically associated with the pulse output for a utility meter. The RDM tracks continuous values and associated customer-values. Customers-values may be reset by a customer allowing the customer to easily track resource consumption.

20 Claims, 4 Drawing Sheets

REMOTE MODULE FOR UTILITY METERS

CLAIM TO PRIORITY

This application claims priority to provisional application 60/894,980 filed on Mar. 15, 2008, the entire contents of which are incorporated herein by this reference for all purposes.

TECHNICAL FIELD OF THE INVENTION

The present invention relates to an apparatus for remote display of a reading from an electronic device including the functionality to retransmit such reading to a remote device.

BACKGROUND OF THE INVENTION

Water utilities install water meters at customer sites to meter the consumption of water by a water customer. When a site includes a building containing multiple customer residences (e.g. condominiums, apartment buildings, etc.) such water meters are often installed in locations not easily viewable by a customer. As a result, such water customers are not able to view the consumption data generated by their water meter. Consequently, water utilities have a need for a module that displays water consumption data to a user where such module is installed in a convenient location for customer viewing.

Prior art water meters typically are configured with pulse outputs that provide access to pulse signals relatable to the amount of water flowing through the meter. What is needed is a Remote Counter Display Module (RDM) comprising at least one input port that is electrically associated with the pulse output of a water meter wherein such RDM provides a plurality of functions such as a counter preset, counter reset, continuous counter value, a customer re-setable counter value, a sleep mode and a dual input that can be connected to two separate registers and combine the register data to provide a display value that is the "total" resource consumption value.

Many resource providers will eventually wish to upgrade their system to include automatic meter reading (AMR) capabilities. Consequently, there is a need for a RDM that can be easily upgraded to be compatible with AMR systems.

SUMMARY

Some of the objects and advantages of the invention will now be set forth in the following description, while other objects and advantages of the invention may be obvious from the description, or may be learned through practice of the invention.

Generally speaking, one object of the invention is to provide an apparatus for displaying a meter reading at a remote location.

Another general object the invention is to provide a remote display module comprising an owner settable value that allows the RMD owner to set the RMD display value to a value indicated by a metering device.

Another general object of the invention is to provide a remote display module comprising a customer re-setable counter value and allow a resource consumer to reset such customer re-setable counter value to allow such customer to track resource consumption over a period of time.

Additional objectives and embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
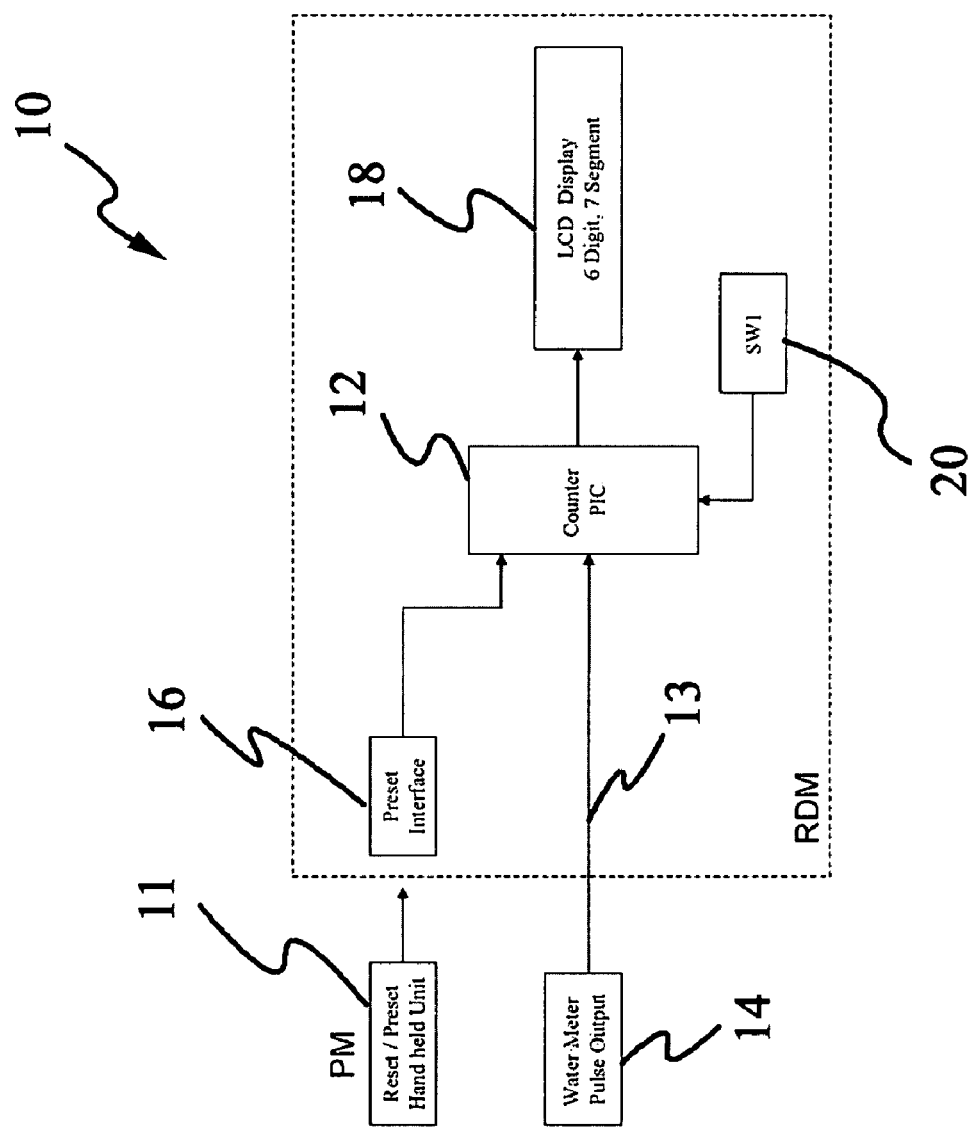
FIG. 1 is a block diagram representation an RDM device according to one embodiment of the invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest.

It will be appreciated that while this document contains headers, such headers are place markers only and are not intended to form a part of this document or affect its construction.

Referring now to FIG. 1, one exemplary embodiment of an RDM (10) electrically associated with a single meter is presented. RDM (10) comprises a processing device (12) electrically associated with preset interface (16) and further electrically associated with display device (18). A switch (20) is provided for accessing RDM (10) functions. Switch (20) is electrically associated with processing device (12) and is configured for causing process device (12) to perform at least one predefined function as described later.

Processing device (12) may be of any suitable technology. For one exemplary embodiment of the invention, processing device (12) is at least one PIC class 28 processor. For such a configuration, the PIC class 28 processor may perform the counter functions and display driver functions (as described later). Alternatively, processing device (12) may be a PIC class 18 processor configured to perform the counting functions and further configured to work in conjunction with yet a second LCD driver processor (depending on the display technology used).

For single meter configurations, the RDM is electrically associated with the pulse output of a water meter (14) via communication connection (13). For the embodiment depicted in FIG. 1, communication connection (13) is wired twisted pair cable connection. When water meter (14) determines a predefined amount of resource consumption, meter (14) generates an electrical pulse that is detected by processing device (12) via communication connection (13).

It should be appreciated that such a connection (13) may be achieved using wireless technologies. For example communication connection (13) may include a transmitter electrically associated with the pulse output of water meter (14) and a receiver electrically associated with processing device (12). Such transmitter/receiver technologies are preferably relatively low power devices that operate in an unlicensed band or at a power level that does not require a license. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention.

Display device (18) is configured to displaying a resource consumption value derived from the counter data recorded by processing device (12). Display (18) is configured to display consumption data when switch (20) is pressed. In addition, display (18) may display consumption data/values at predefined intervals or at random intervals. The consumption data will be displayed for a predefined amount of time after which the display driver and the LCD display will go into a sleep mode (depending on the configuration used). For configurations where the display device comprises a memory (as described below) the last consumption value may remain displayed until updated with a new consumption value.

It will be appreciated that processing device (12) may perform the LCD driver functions or display device (18) may include its one processor.

For one alternative embodiment of RDM (10), display (18) may be configured to provide a display readout when power is removed from the display. For this embodiment, an image is written on the LCD display and when power is removed, the display will retain the image virtually indefinitely or until "erased" by processing device (12). Such a LCD display uses a technique developed by Zenithal Bistable Devices (ZBD), which adds a finely ridged grating to the inner glass surface of an LCD cell of Super-Twist-Nematic (STN) construction. As in known in the art the presence of the grating "latches" the polarization state of the liquid crystals and retains it when power is removed.

For yet another alternative embodiment, at least a portion of the RDM body may be configured to provide a display function. For example, the entire surface of one side of RDM (10) may comprise a display configurable to display various images including pictures, data, and status signals. For such embodiment, display (18) may comprise an integral display interface configured for providing communications between processing device (12) and display (18). Such interface may comprise a customizable touch screen controller configured for control and decoding functions for display (18) depending on the RDM (10) application. For such an alternative embodiment, display (18) is a flexible display such as an "electronic paper" display manufactured by Fujitsu.

Figure 2:
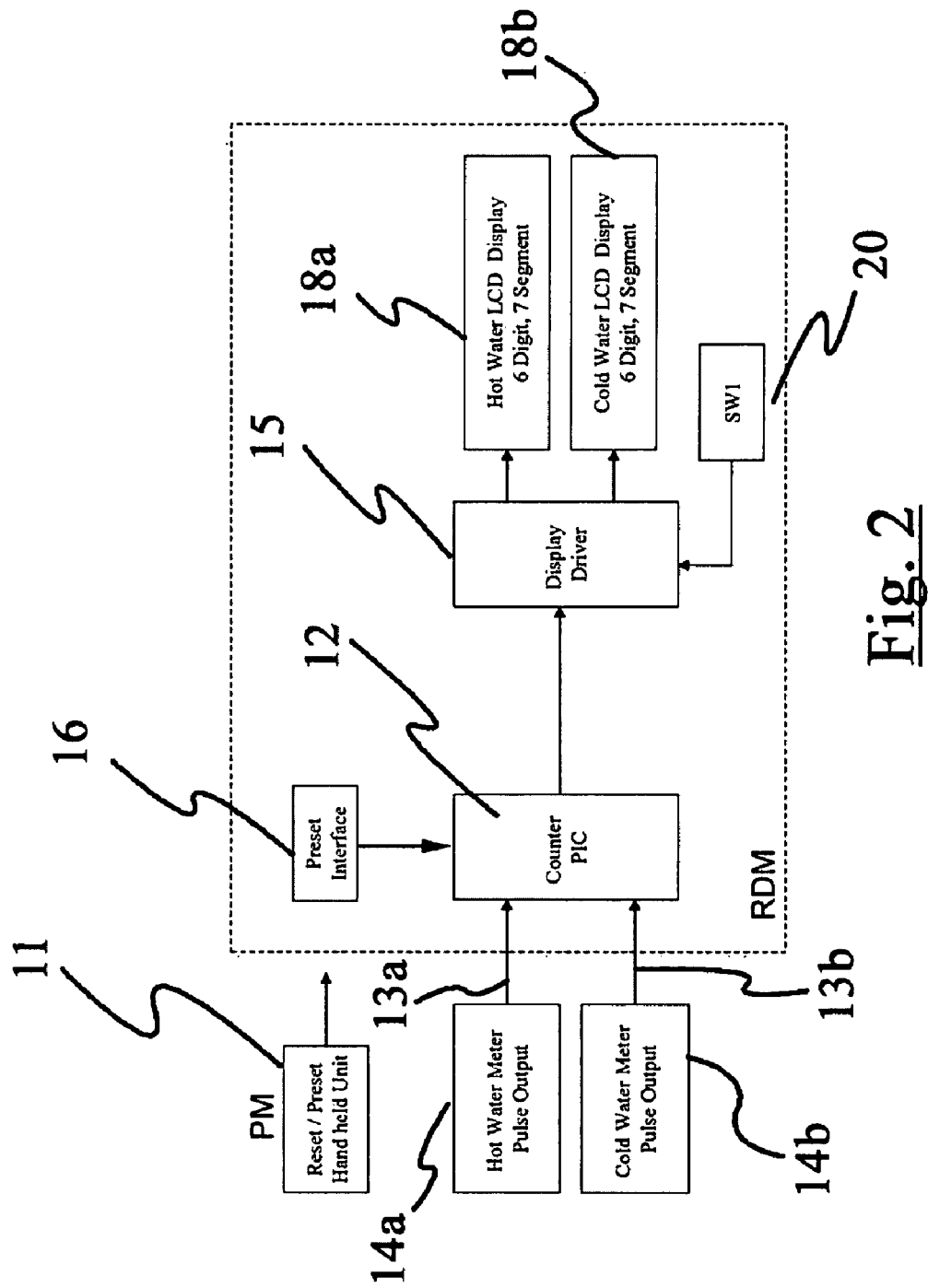
FIG. 2 is a block diagram representation an alternative embodiment of the RDM device comprising a dual input and dual readout feature.
Figure 3:
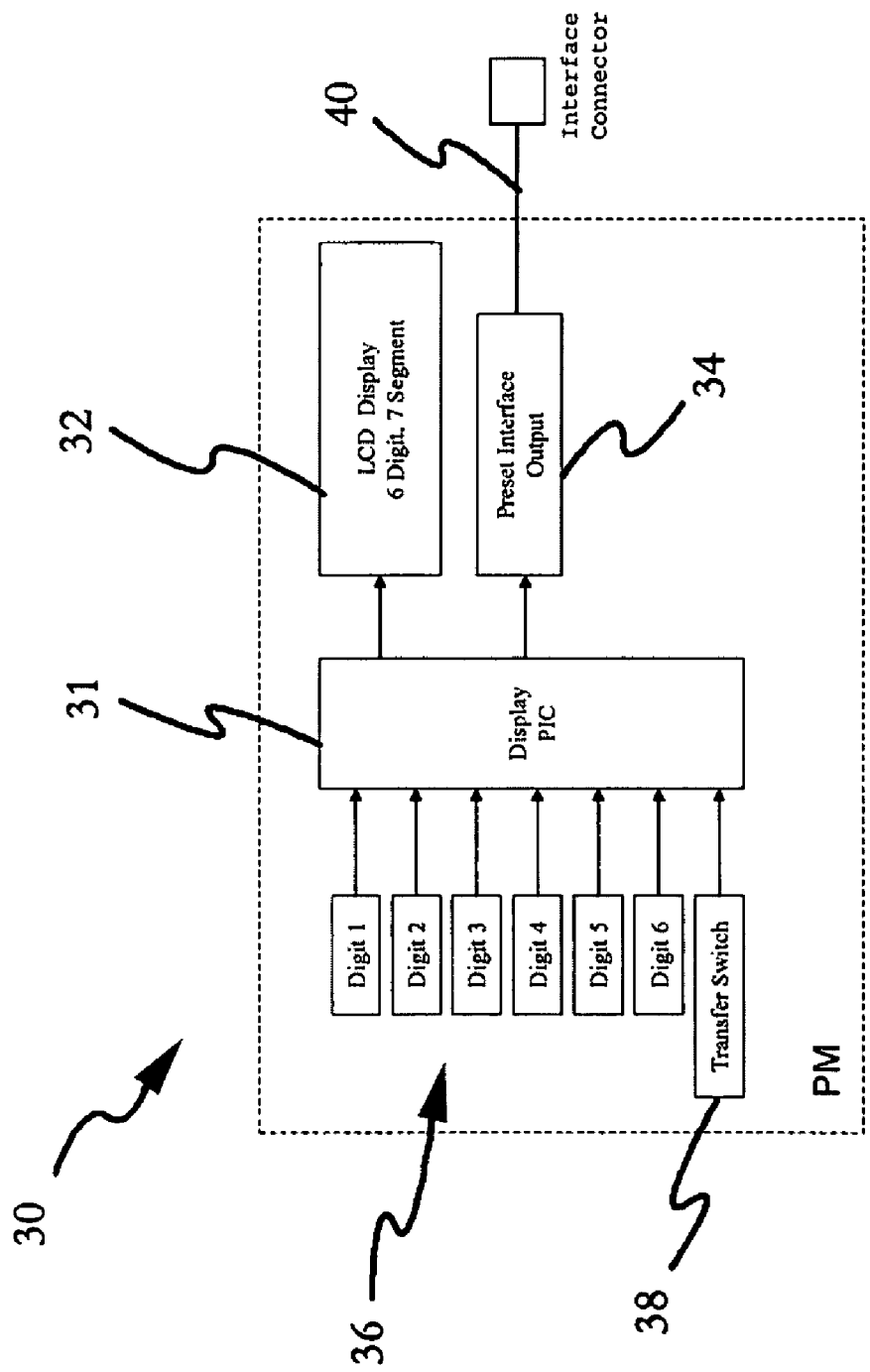
FIG. 3 is a block diagram representation of Programming Module according to another embodiment of the invention.

Referring now to FIG. 2, some installations require two meters. For example, some larger housing facilities may have a single boiler system for heating water that is supplied to individual housing units. Consequently, such installations may require a hot water meter and a cold water meter. For this embodiment, processing device (12) has two pulse input ports configured for receiving pulses from two meters—hot water meter (14a) and cold water meter (14b). Processing device (12) counts the pulses and periodically at a predefined interval, sends count data to processing device (15).

Processing device (15) may be any type of device suitable for driving display (18a) and display (18b) and may include any of the technologies described above for display (18). Displays (18a) and (18b) are configured to display consumption data/values when switch (20) is pressed. In addition, displays (18a) and (18b) may display consumption data/values a predefined intervals or at random intervals. The consumption data will be displayed for a predefined amount of time after which the display driver and the LCD display will go into a sleep mode (depending on the configuration used). For configurations where the display device comprises a memory (as described above) the last consumption value may remain displayed until updated with a new consumption value.

The RDM (10) may be powered by any suitable power source (not shown in the figures). Utility regulations typically do not allow a utility metering device to be connected to a local power source. Consequently, water utility devices are typically battery powered. Thus, for the preferred embodiment, RMD (10) uses low powered devices that are powered by a battery such as at least one replaceable 3.6 volt A Cell lithium battery. Where voltages greater than 3.6 volts are required, a voltage pump is used to generate the required voltage.

Preset Module

The RDM (10) comprises a preset interface (16) configured for being electrically associated with a handheld Preset Module (PM) (30). As described later in this document, the PM (30) is configured to transfer a counter value from the PM (30) device to RDM (10) thereby presetting the RDM (10) device to any value desired. Preferably such value would be the current reading indicated by utility meter (14). PM (30) comprises processing device (31) electrically associated with a display device (32). PM (30) is further electrically associated with an interface output (34) which is described in more detail below. Display device (32) is preferably configured to display a six digit, seven segment number. Switches (36) are used to set each digit of such six digit number to any value desired. Each push button switch is configured to advance the display value for a digit on the LCD display. For example, Digit 5 switch is configured to advance the fifth digit of the LCD display. A user simply presses the appropriate digit switches to generate a desired LCD display value. Once the LCD Display is displaying a desired value, such value is either transferred to the Preset Interface Output or stored in memory. Additionally, one or more secondary numbers may be associated with the preset value. Such a secondary number may be a meter serial number or customer number.

After the PM (30) device is programmed with at least one or more values, interface output ((34) is electrically associated with the present interface (16) of a RDM (10). The user then scrolls through the preset values using a scroll switch (not shown) until the appropriate value is displayed on display (32). Next, the transfer switch (38) is pressed and the value being displayed on the display (32) and any associated "secondary numbers" are transfer from PM (30) to RDM (10). Such values become meter-a-value and meter-b-value for the discussions presented later.

It should be appreciated that with such a configuration, a user can go to a meter installation site, enter the meter readings for one or more meters in RDM (30) and then take the RDM (30) device to the RMD (10) installation location and preset the RMD (10) device to the appropriate value.

RF Modules

Figure 4:
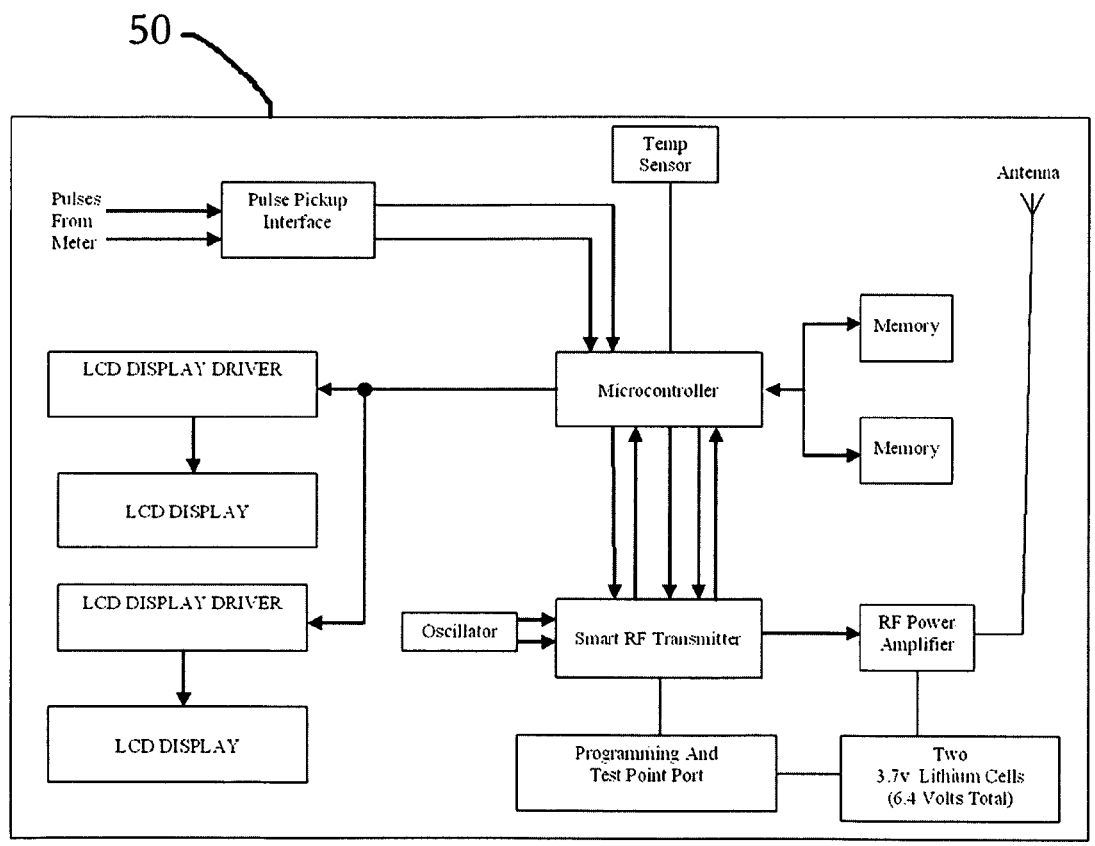
FIG. 4 is a block diagram representation of a RMD device comprising RF features for communication with an AMR system.

Referring now to FIG. 4, one alternative embodiment of RDM (10) includes a RF enabled embodiment. One suitable RF technology is disclosed in co-owned U.S. application Ser. No. 10/989,811 relating to a smart transmitter for utility meters and such application is incorporated by this reference for all that it discloses. For this embodiment of the invention, RMD (10) is configured to not only display the resource consumption data, but also transmit such data to a remote AMR device. The data transmitted may include: leak detection data, tamper data, backflow detection data, batter status, and clock status (where applicable).

Display Modes

The RDM (10) display modes and features are now considered. RDM (10) includes several unique features including a counter preset, counter reset, continuous counter value and a customer re-setable counter value. For come configurations, display (18) is always active and displaying a value, however, for some embodiments display (18) enters a sleep mode after a predefined time period. For such a configuration, when switch (20) is pressed, the display (18) powers up and the processing device (12) transfers consumption data to display (18) where such data is viewed by a customer. After a predefined amount of time, the display (20) goes into a sleep mode to conserve power.

As discussed above, RMD (10) keeps track of several values. For a particular meter of interest, RDM (10) preferable keeps track of a continuous value and a customer-value. The continuous-value may only be reset by a PM (30) device whereas a customer-value may be reset by a customer. Examples of continuous values are meter-a-value (e.g. cold water meter), meter-b-value (e.g. hot water meter) as described above. Each time a continuous-value is updated, its corresponding customer-value is updated. For example, a meter-a-value may be 10,000 units and a corresponding customer-value may be 500 units as it had been reset by a customer in the past. RMD (10) next determines 10 units of resource has been consumed and updates the meter-a-value to 10,010 and updates the customer-value to 510.

For the preferred embodiment, RDM (10) includes a feature that allows a customer to set/reset a customer-value. For such embodiment, a customer presses a switch (20a, not shown) to reset the customer-value to zero. It should be appreciated that for such a configuration, a customer may easily track resource consumption over a period of time. For example, a customer resets the hot water meter customer-value and then takes a shower. The customer returns to the RDM (10) after the shower and views the hot water customer-value to see how much hot water was used. In addition, RDM (10) may be configured with a unit cost so that a dollar value is also present. Similarly, using the customer-value feature, resource consumption can be tracked over longer periods of time as desired (e.g. week, month, year, etc.)

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An apparatus for remotely displaying a resource consumption value associated with a metering device, such apparatus comprising:

a processing device comprising at least one input suitably configured for being electrically associated with a metering device through a communication link, said metering device configured to generate a meter reading value and a resource consumption signal;

wherein said processing device is configured to receive said resource consumption signal over said communication link;

a memory that is at least one of (a) integral to, and (b) electrically associated with, said processing device and configured for storing continuous resource consumption data and a customer resetable resource consumption value;

wherein said processing device is configured to use at least part of said resource consumption signal to update at least one of (a) the stored continuous resource consumption data so that said stored continuous resource consumption data value is substantially equal to said meter reading value, and (b) the customer resettable resource consumption value;

a display electrically associated with said processing device and suitably configured for displaying at least one of said continuous resource consumption data value and said customer resetable resource consumption value and wherein said display is controlled by a display controller that is one of (a) an integral display controller, (b) a external display controller electrically associated with said processing device; and (c) said processing device;

a power source electrically associated with at least said processing device and said display;

a preset interface suitably configured for being electrically associated with a programming module and further suitably configured for transferring initial continuous resource consumption values from said programming module to said memory;

a reset device electrically associated with said processing device wherein said processing device is configured to reset said resettable resource consumption value to a predefined value when said reset device is activated; and wherein said display device is configured to display resource consumption values for at least one of (a) continuously, (b) for a predefined time period, and (c) upon customer request wherein said resource consumption values are derived by said processing device using said continuous resource consumption values.

2. An apparatus for remotely displaying a resource consumption value as in claim 1, further comprising an transmitter circuit electrically associated with said processing device wherein said transmitter circuit is configured to transmit data to a remote location.

3. An apparatus for remotely displaying a resource consumption value as in claim 1, wherein said communication link comprises:
an external transmitter module configured for being electrically associated with the output of a water meter, said external transmitter module configured to receive a resource consumption signal from said water meter and transmit a transmitted-resource-consumption-signal;
a internal receiver electrically associated with said processing device and configured to receive said transmitted-resource-consumption-signal from said external transmitter module.

4. An apparatus for remotely displaying a resource consumption value as in claim 2, wherein said communication link is configured to be electrically associated with a plurality of meters and wherein said continuous resource consumptions values include a cold water value and a hot water value.

5. An apparatus for remotely displaying a resource consumption value as in claim 4, wherein said display is configured to display said cold water value and hot water value.

6. An apparatus for remotely displaying a resource consumption value as in claim 5, wherein said display is configured to display said cold water value and hot water value simultaneously.

7. An apparatus for remotely displaying a resource consumption value as in claim 6, wherein said display device is configured to retain a displayed value when no display signal is being received from said display controller.

8. An apparatus for remotely displaying a resource consumption value as in claim 1, wherein said display is configured to generate a display for a predefined display interval upon user request and wherein said display enters a sleep mode after said predefined display interval has elapsed.

9. An apparatus for remotely displaying a resource consumption value associated with a metering device, said apparatus comprising:
a processing device comprising a first input suitably configured for being electrically associated with a first metering device through a communication link, wherein said first metering device is configured to generate a first-meter-value and a first-meter-data-signal, wherein said first-meter-value is relatable to past resource consumption measured by said first metering device and wherein said first-meter-data-signal is relatable to current resource consumption being measured by said first metering device and wherein said processing device is further configured to receive said first-meter-data-signal from said first metering device via said communication link;
a memory that is at least one of (a) integral to, and (b) electrically associated with said processing device and configured for storing a first continuous resource consumption counter value, wherein said first continuous resource consumption counter values is one of: (a) substantially equal to said first-meter-value and represents a first-remote-display-value, and (b) used by said processing device to derive a first-remote-display-value, wherein said first-remote-display-value that is substantially equal to said first-meter-value;
a display electrically associated with said processing device and suitably configured for displaying said first-remote-display-value, and wherein said display is controlled by a display controller that is one of (a) an integral display controller, (b) a discrete display controller electrically associated with said display and said processing device; and (c) said processing device;
a power source electrically associated with at least said processing device and said display;
a preset interface suitably configured for being electrically associated with a programming module and configured for receiving an initial first continuous resource consumption counter value; and
wherein said display device is configured to display said first-remote-display-value for a display time interval equal to at least one of (a) continuously, (b) for a predefined time period, and (c) upon customer request for a predefined time period.

10. An apparatus for remotely displaying a resource consumption value as in claim 9, further comprising an transmitter circuit electrically associated with said processing device wherein said transmitter circuit is configured to transmit data to a remote location.

11. An apparatus for remotely displaying a resource consumption value as in claim 9, wherein said communication link is a wireless link comprising:
an external transmitter module configured for being electrically associated with said first-metering-device and further configured to receive said first-meter-data-signal and transmit a first transmitted meter-data-signal; and
a internal receiver electrically associated with said processing device and configured to receive said first transmitted meter-data signal.

12. An apparatus for remotely displaying a resource consumption value as in claim 2, wherein said communication link is further configured for being electrically associated with a second-metering-device configured to generate a second-meter-value and a second-meter-data-signal, wherein said second-meter-value is relatable to past resource consumption measured by said second-metering-device and wherein said second-meter-data-signal is relatable to current resource consumption being measured by said second-metering-device and wherein said processing device is further configured to receive said second-meter-data-signal from said second-metering-device via said communication link;
wherein said memory is further configured for storing a second continuous resource consumption counter value, wherein said second continuous resource consumption counter value is one of: (a) substantially equal to said second-meter-value and represents a second-remote-display-value, and (b) used by said processing device to derive a second-remote-display-value that is substantially equal to said second-meter-value; and
wherein said display is further configured for displaying said second-remote-display-value.

13. An apparatus for remotely displaying a resource consumption value as in claim 12, wherein said processing device is configured to use at least part of said second-meter-data-signal to update said a second continuous resource consumption counter value.

14. An apparatus for remotely displaying a resource consumption value as in claim 13, wherein said display is configured to display said first remote-display-value and said second-remote-display-value simultaneously.

15. An apparatus for remotely displaying a meter value associated with a metering device, such apparatus comprising:

a processing device comprising a first input suitably configured for being electrically associated with a first metering device through a communication link, wherein said first metering device is configured to generate a first-meter-value and a first-meter-data-signal, wherein said first-meter-value is relatable to past resource consumption measured by said first metering device and wherein said first-meter-data-signal is relatable to current resource consumption being measured by said first metering device and wherein said processing device is further configured to receive said first-meter-data-signal from said first metering device via said communication link;

wherein said processing device is further suitably configured for being electrically associated with a second metering device through said communication link, wherein said second metering device is configured to generate a second-meter-value and a second-meter-data-signal, wherein said second-meter-value is relatable to past resource consumption measured by said second metering device and wherein said second-meter-data-signal is relatable to current resource consumption being measured by said second metering device and wherein said processing device is further configured to receive said second-meter-data-signal from said second metering device via said communication link;

a memory electrically associated with said processing device and configured for storing a first continuous resource consumption counter value, wherein said first continuous resource consumption counter values is one of: (a) substantially equal to said first-meter-value and represents a first-remote-display-value, and (b) used by said processing device to derive a first-remote-display-value that is substantially equal to said first-meter-value;

wherein said memory is further configured for storing a second continuous resource consumption counter value, wherein said second continuous resource consumption counter values is one of: (a) substantially equal to said second-meter-value and represents a second-remote-display-value, and (b) used by said processing device to derive a second-remote-display-value that is substantially equal to said second-meter-value;

a display electrically associated with said processing device and suitably configured for displaying said first-remote-display-value and said second-remote-display-value, and wherein said display is controlled by a display controller that is one of (a) an integral display controller, (b) a discrete display controller electrically associated with said display and said processing device; and (c) said processing device;

a power source electrically associated with at least said processing device and said display;

a preset interface electrically associated with said processing device, said preset interface configured for being electrically associated with one of (a) an external programming module, and (b) an integral programming module, and wherein said processing device is configured to received and transfer to said memory initial continuous resource consumption counter values from said programming module; and wherein said display device is configured to generate a display for a display time interval equal to at least one of (a) continuously, (b) periodically for a predefined time period, and (c) upon customer request for a predefined time period.

16. An apparatus for remotely displaying a resource consumption value as in claim 10, wherein said communication link is a wireless link comprising:

a plurality of external transmitter modules wherein each external transmitter module is electrically associated with a metering device and further configured to receive the meter-data-signal generated by said metering device and transmit a transmitted-meter-data-signal;

a internal receiver electrically associated with said processing device and configured to receive said transmitted-meter-data-signal.

17. An apparatus for remotely displaying a resource consumption value as in claim 15, wherein said display is configured to display said first-remote-display-value and said second-remote-display-value simultaneously.

18. An apparatus for remotely displaying a resource consumption value as in claim 17, wherein said apparatus further comprises an external programming module comprising:

a module-processing-device electrically associated with a module-display and a module-interface suitably configured for being electrically associated with said preset interface;

a module-memory that is one of (a) integral to, and (b) electrically associated with, said module-processing-device and configured to store a module-data-value;

a module display electrically associated with said module-processing-device and suitable for displaying said module-data-value;

a plurality of input devices configured to receive user input wherein said user input is use by said module-processing-device to set the module-data-value stored in said module-memory; and wherein said module-processing-device is further configured to transfer said module-data-value to said processing device when the module-interface is electrically associated with said preset interface.

19. An apparatus for remotely displaying a resource consumption value as in claim 17, wherein said module-processing-device is further configured to receive a secondary number from a user via said plurality of input devices and store said number in said module-memory so that said secondary number is associated with said module-data-value.

20. An apparatus for remotely displaying a resource consumption value as in claim 17, wherein said apparatus further comprises a plurality of input devices configured to receive user input wherein said user input is use by said processing device to set the stored continuous resource consumption counter values stored in said memory.

* * * * *